(12) United States Patent
Goodman et al.

(10) Patent No.: US 7,936,504 B2
(45) Date of Patent: May 3, 2011

(54) FULLY ARTICULATED PERISCOPE CAMERA SYSTEM

(75) Inventors: Ronald C. Goodman, Westlake Village, CA (US); Attila Szalay, Agoura Hills, CA (US); Clark A. Pentico, Simi Valley, CA (US); Walt Caldwell, Thousand Oaks, CA (US)

(73) Assignee: Snakehead Technologies, LLC, Westlake Village, CA (US)

( * ) Notice: Subject to any disclaimer, the term of this patent is extended or adjusted under 35 U.S.C. 154(b) by 403 days.

(21) Appl. No.: 11/954,497

(22) Filed: Dec. 12, 2007

(65) Prior Publication Data

US 2008/0144156 A1 Jun. 19, 2008

Related U.S. Application Data

(60) Provisional application No. 60/869,852, filed on Dec. 13, 2006.

(51) Int. Cl.
*G02B 23/22* (2006.01)
(52) U.S. Cl. .................. 359/403; 359/402; 359/405
(58) Field of Classification Search ........... 359/402–406
See application file for complete search history.

(56) References Cited

U.S. PATENT DOCUMENTS

| | | | |
|---|---|---|---|
| 4,636,044 A | 1/1987 | Loy | |
| 4,989,466 A | 2/1991 | Goodman | |
| 5,250,973 A | 10/1993 | Pijlman | |
| 5,278,696 A | 1/1994 | Suvada | |
| 5,426,476 A | 6/1995 | Fussell et al. | |
| 5,469,236 A * | 11/1995 | Roessel | 396/432 |
| 5,765,044 A | 6/1998 | Murai et al. | |
| 6,023,061 A | 2/2000 | Bodkin | |
| 6,094,302 A * | 7/2000 | Bergstedt | 359/403 |
| 6,101,337 A | 8/2000 | Ogata | |
| 6,163,375 A | 12/2000 | Piallat | |
| 6,377,398 B1 * | 4/2002 | Pieri et al. | 359/405 |
| 6,400,503 B1 | 6/2002 | Mickelson | |
| 6,405,975 B1 | 6/2002 | Sankrithi et al. | |
| 6,542,181 B1 | 4/2003 | Houska et al. | |
| 6,731,845 B1 | 5/2004 | Gerdt | |
| 2004/0136062 A1 * | 7/2004 | Farkash | 359/402 |

* cited by examiner

*Primary Examiner* — Joshua L Pritchett
(74) *Attorney, Agent, or Firm* — Snell & Wilmer L.L.P.

(57) ABSTRACT

The camera or periscope system may include a taking lens, a beam steering device, a relay device, and an image rotation device. The camera or periscope system can be used to image in situations where the camera is not easily redirected to view a desired object of interest. The camera or periscope system is designed to be fixed to a mounting platform where the taking lens can be configured to point to the desired object of interest.

37 Claims, 10 Drawing Sheets

FULLY ARTICULATED PERISCOPE CAMERA SYSTEM

CLAIM OF PRIORITY UNDER 35 U.S.C. §119

The present application for patent claims priority to U.S. Provisional Application No. 60/869,852 entitled "FULLY ARTICULATED PERISCOPE CAMERA SYSTEM," filed Dec. 13, 2006, and assigned to the assignee hereof and hereby expressly incorporated by reference herein.

BACKGROUND

1. Field

The invention relates generally to cameras and periscopes. More particularly, the invention relates to a fully articulated periscope camera system that can take stable pictures and video.

2. Background

Television and movie studios are increasingly using airplanes and helicopters to film television commercials, shows and movies. In some instances, a camera operator is in an airplane or helicopter holding the video camera steady to take the pictures and video. Alternatively, the video camera may be mounted to the airplane or helicopter and the camera operator may control the movement of the video camera. In both instances, the pictures produced may be blurry or the video produced may jitter due to vibrations of the camera operator and/or the airplane or helicopter.

Most high performance aerial video camera systems require effective vibration compensation of high frequency, airplane and wind vibration components for smooth, jitter-free pictures and video. Currently, effective vibration compensation is generally achieved by using some form of gyro-stabilization.

SUMMARY

The camera or periscope system may include a taking lens, a beam steering device, a relay device, and an image rotation device. The camera or periscope system can be used to image in situations where the camera is not easily redirected to view a desired object of interest. The camera or periscope system is designed to be fixed to a mounting platform where the taking lens can be configured to point to the desired object of interest.

The camera or periscope system allows views that were not obtainable from previous methods for viewing from a moving platform. The camera or periscope system allows positioning of the taking lens in restricted spaces. The camera or periscope system has applications in cinematography, digital cinema, photography, reconnaissance and surveillance. The camera or periscope system improves the quality and capability of cinematography for various applications.

Some advantage of the camera or periscope system may include large pan and tilt ranges, an image stabilizing system for one or more axis, an ability to roll images, an easy to use system, an ability to capture stationary and still view objects located at virtually any location, and simplified alignment tolerances.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION

Apparatus, systems and methods that implement the embodiments of the various features of the invention will now be described with reference to the drawings. The drawings and the associated descriptions are provided to illustrate some embodiments of the invention and not to limit the scope of the invention. Throughout the drawings, reference numbers are re-used to indicate correspondence between referenced elements. In addition, the first digit of each reference number indicates the figure in which the element first appears.

Figure 1:
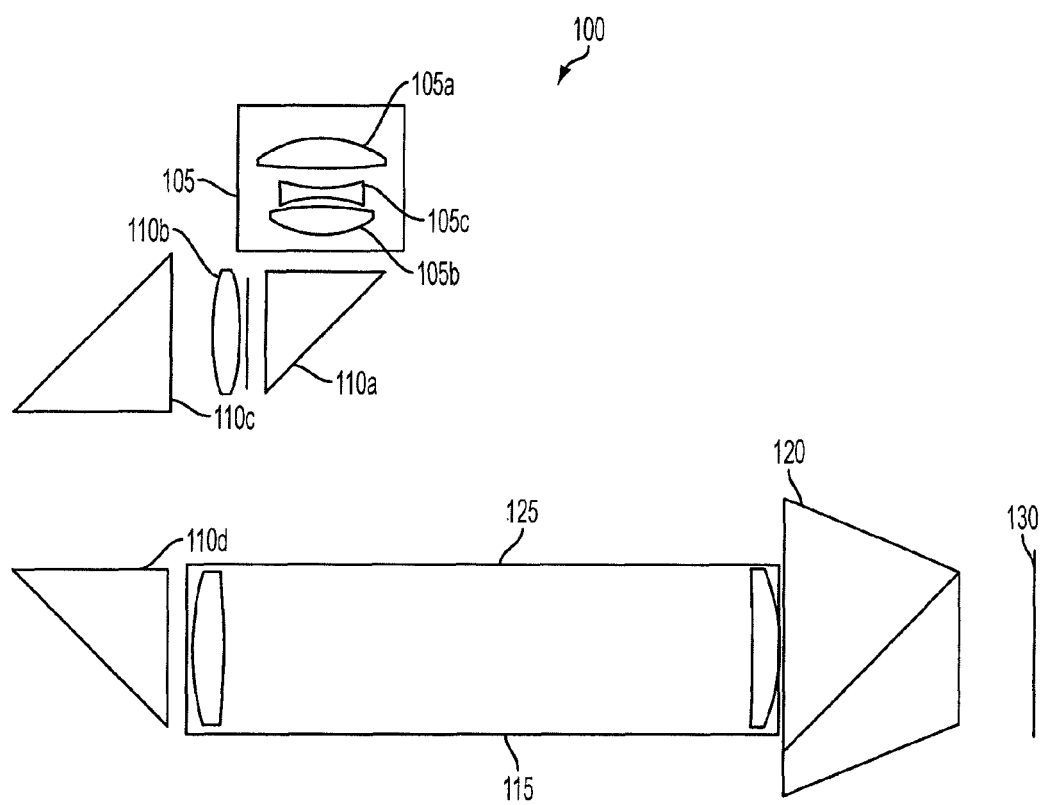
FIG. 1 is an exemplary configuration of a camera or periscope system according to an embodiment of the invention.

FIG. 1 is an exemplary configuration of a camera or periscope system 100 according to an embodiment of the invention. The camera or periscope system 100 may include a taking lens 105, a beam steering device 110, a relay device 115, and an image rotation device 120. A Gyro-stabilization device may be connected to the camera or periscope system 100 to stabilize the images (e.g., pictures or video). The camera or periscope system 100 may be hand carried, suspended mounted or mounted in or on a vehicle such as a fixed wing aircraft, a rotary winged aircraft (e.g., a helicopter), a wheeled vehicle, a hovercraft, a tracked vehicle, and a rocket. The image can be stabilized and captured on film and viewed visually. Each of the components of the camera or periscope system 100 can operate in the visible spectrum, the ultraviolet spectrum and the infrared spectrum. The camera or periscope system 100 can be computer controlled, temperature regulated for extreme environments, and nitrogen purged. The camera or periscope system 100 can be a projector.

The taking lens 105 may include one or more lenses configured to produce an image or form an intermediate image. For example, the taking lens 105 may be a zoom lens or a multi-element lens assembly configured to produce an image. Referring to FIG. 1, the taking lens 105 may be the multi-element lens assembly, which may include the lenses 105a, 105b, and 105c. The taking lens 105 can be any type or quantity of lenses of sufficient quality to generate an image. Preferably, the taking lens 105 is a multi-element zoom lens. The taking lens 105 can be electronically or manually controlled to rotate 360 degrees and move in vertical and/or horizontal directions to capture different images. Hence, the taking lens 105 can be referred to as a "rotatable" or "movable" taking lens 105. In one embodiment, a zoom camera lens is used as the taking lens 105.

Figure 4:
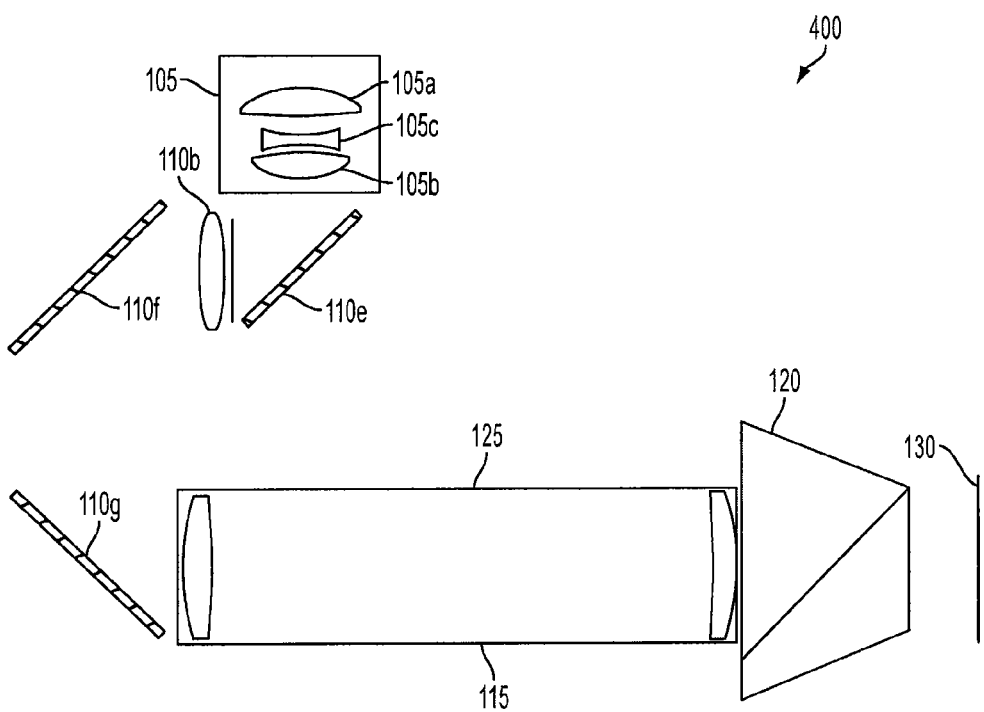
FIG. 4 is an exemplary configuration showing the camera or periscope system according to an embodiment of the invention.
Figure 5:
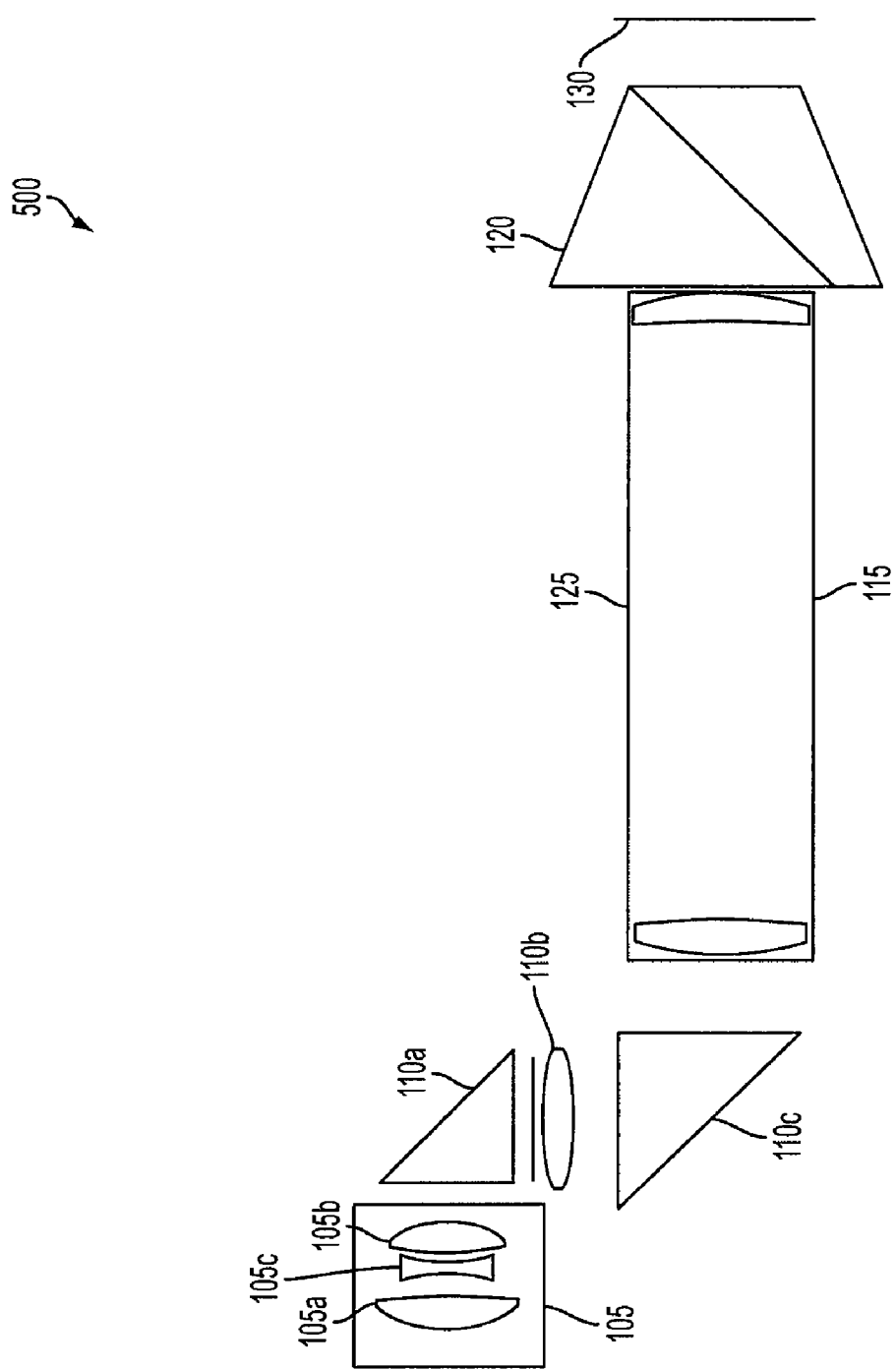
FIG. 5 is an exemplary configuration showing the camera or periscope system according to an embodiment of the invention.
Figure 6:
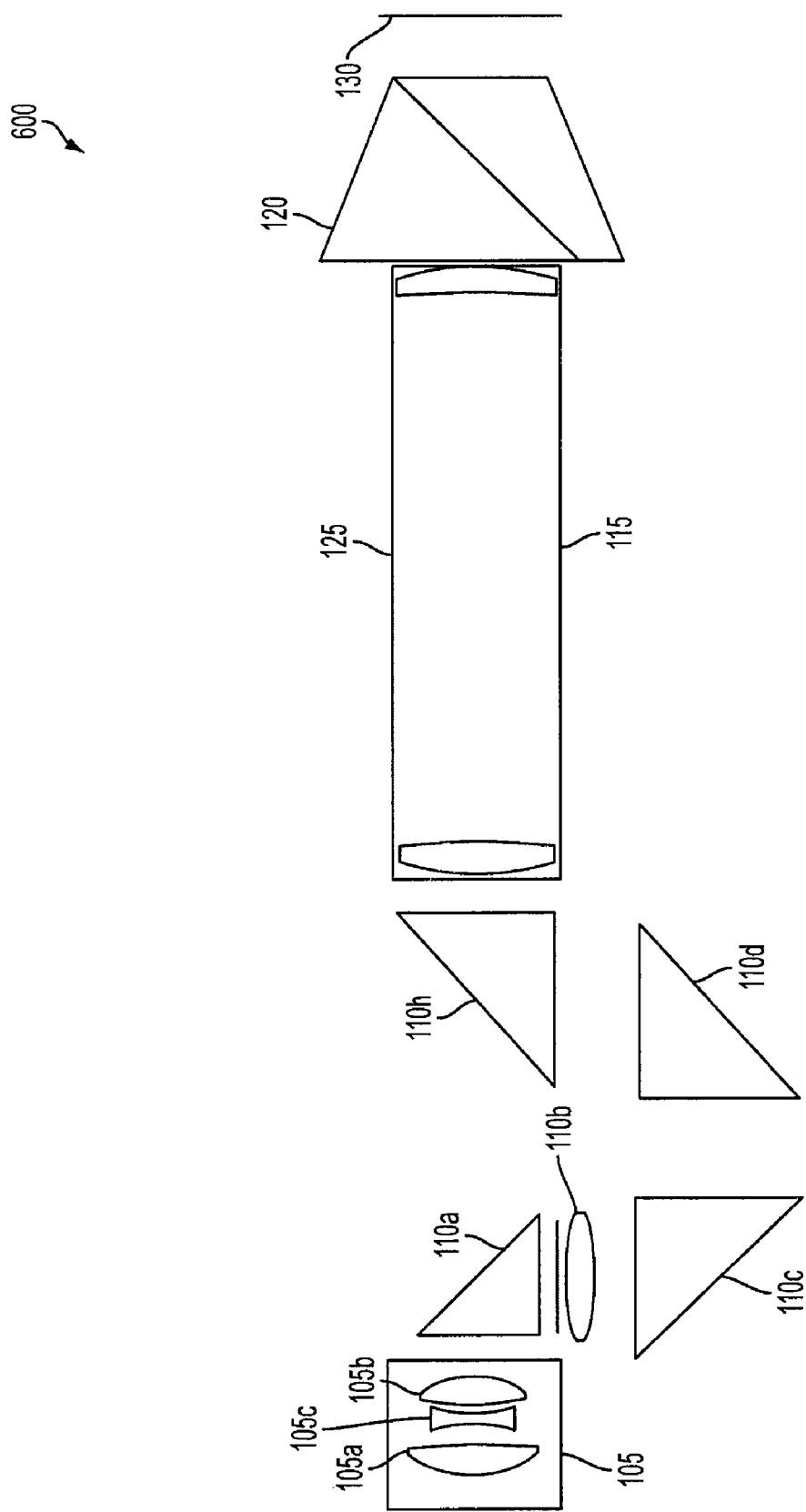
FIG. 6 is an exemplary configuration showing the camera or periscope system according to an embodiment of the invention.

The beam steering device 110 may redirect the light that forms the image and may be used to direct the light to the relay device 115. The beam steering device 110 may include one or more prisms, one or more mirrors, one or more field lenses, one or more coherent fiber optic bundles and combinations thereof. For example in FIG. 4, the beam steering device 110 of the periscope camera system 400 may have the mirrors 110e, 110f, and 110g. For another example in FIG. 5, the beam steering device 110 of the periscope camera system 500 may have 2 right angle prisms 110a and 110c. For yet another example in FIG. 6, the beam steering device 110 of the periscope camera system 600 may have 4 right angle prisms 110a, 110c, 110d, and 110h. In one embodiment, the beam steering device 110 includes 3 right angle prisms and a field lens. As shown in FIG. 1, a first right angle prism 110a is positioned adjacent to the taking lens 105. A second right angle prism 110c may be positioned adjacent to the first right angle prism 110a or adjacent to a field lens 110b. That is, the field lens 110b may be optically positioned between the first right angle prism 110a and the second right angle prism 110c. The field lens 110b directs light into the second right angle prism 110c. A third right angle prism 110d may be positioned adjacent to the second right angle prism 110c. The third right angle prism 110d may be optional. In one embodiment, the light or image may travel from the taking lens 105 to the first right angle prism 110a, through the field lens 110b to the second right angle prism 110c, and then to the third right angle prism 110d. The beam steering device 110 can be electronically or manually controlled to rotate 360 degrees and move in vertical and/or horizontal directions to capture different images. Hence, the beam steering device 110 can be referred to as a "rotatable" or "movable" beam steering device 110.

Figure 7:
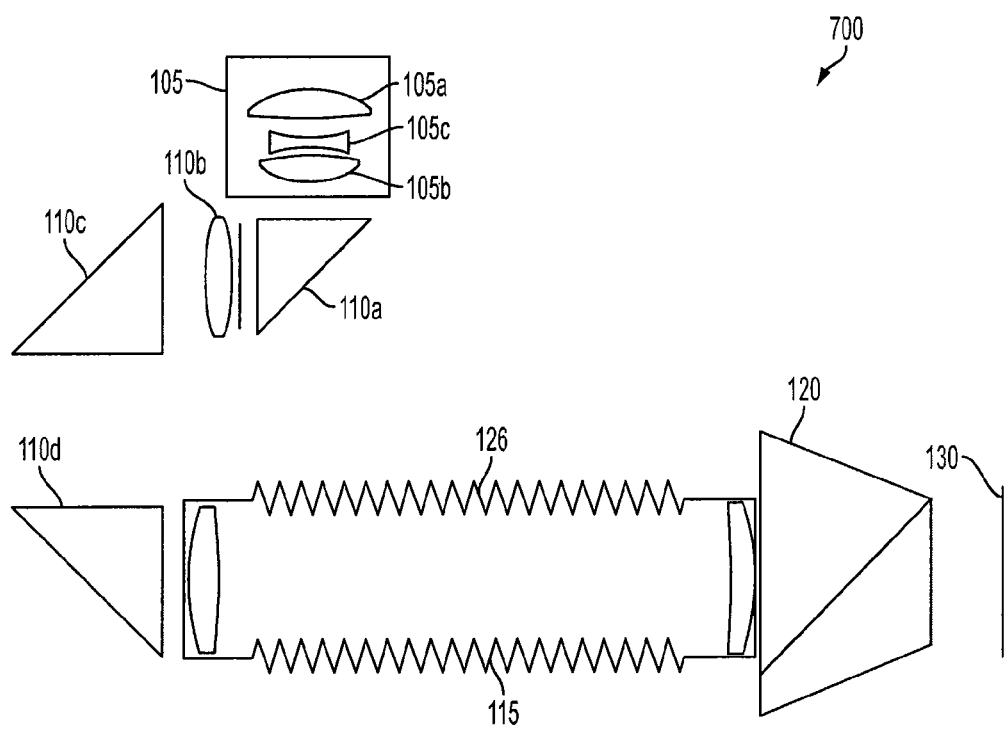
FIG. 7 is an exemplary configuration showing the camera or periscope system according to an embodiment of the invention.
Figure 10:
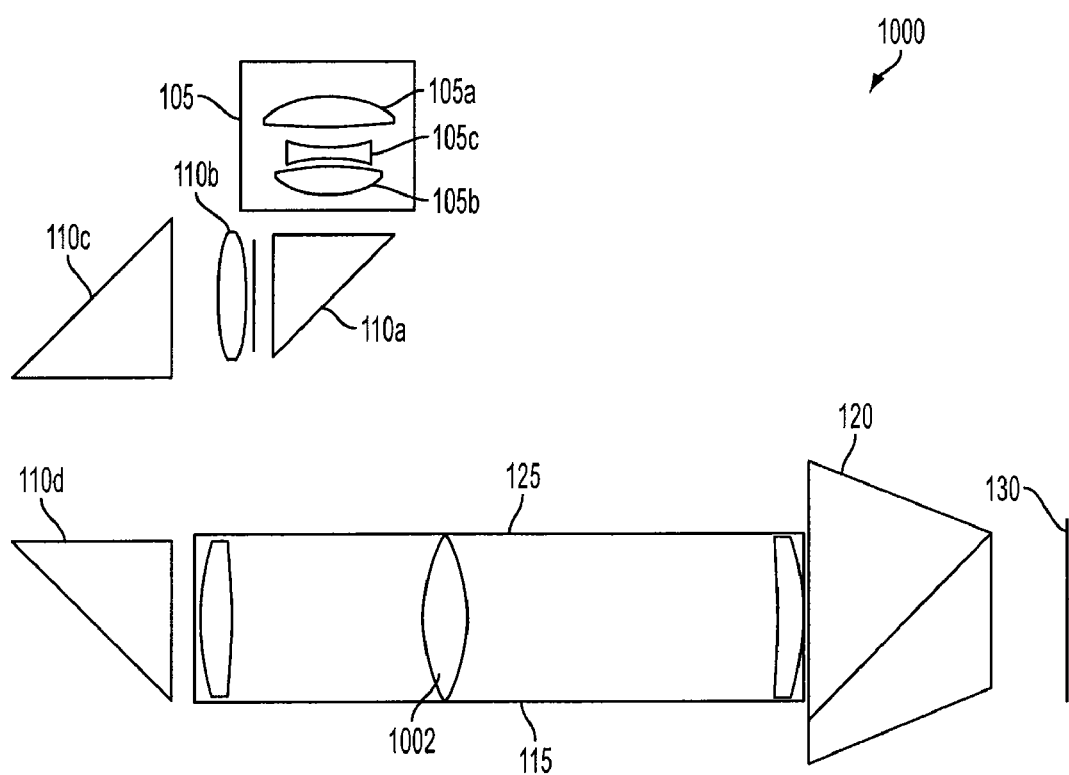
FIG. 10 is an exemplary configuration showing the camera or periscope system according to an embodiment of the invention.

The relay device 115 may receive an image or light from the third right angle prism 110d or the second right angle prism 110c. The relay device 115 may re-image the light from the taking lens 105 and the beam steering device 110. The relay device 115 can magnify or demagnify the image as needed and can change the intermediate image size to match the desired format. The relay device 115 may include a multi-element lens assembly, a multi-element lens assembly positioned in a folded housing or a straight housing, one or more relay lenses having different magnifications, and combinations thereof. For example in FIG. 1, the relay device 115 of the periscope camera system 100 is positioned in the straight housing 125. For another example in FIG. 7, the relay device 115 of the periscope camera system 700 is positioned in the folded housing 126. In one embodiment, the relay device 115 may include a relay lens with a fixed focal length. A multi-element relay lens including more than one lens (e.g., between about 5-15 lenses) can be used as the relay device 115. The multiple lenses can be positioned within the housing 125 in an arrangement or configuration that allows for the multiple lenses to correct for aberrations produced by the beam steering device 110. In one embodiment, the relay device 115 comprises a plurality of different relay lenses having different magnifications thereby capable of zooming. For example in FIG. 10, the relay device 115 of the periscope camera system 1000 has a zoom lens 1002. In one embodiment, the relay device 115 has the magnification for a 4-perferation film format. In another embodiment, the relay device 115 has the magnification for a 70 millimeter (IMAX) film format.

Figure 8:
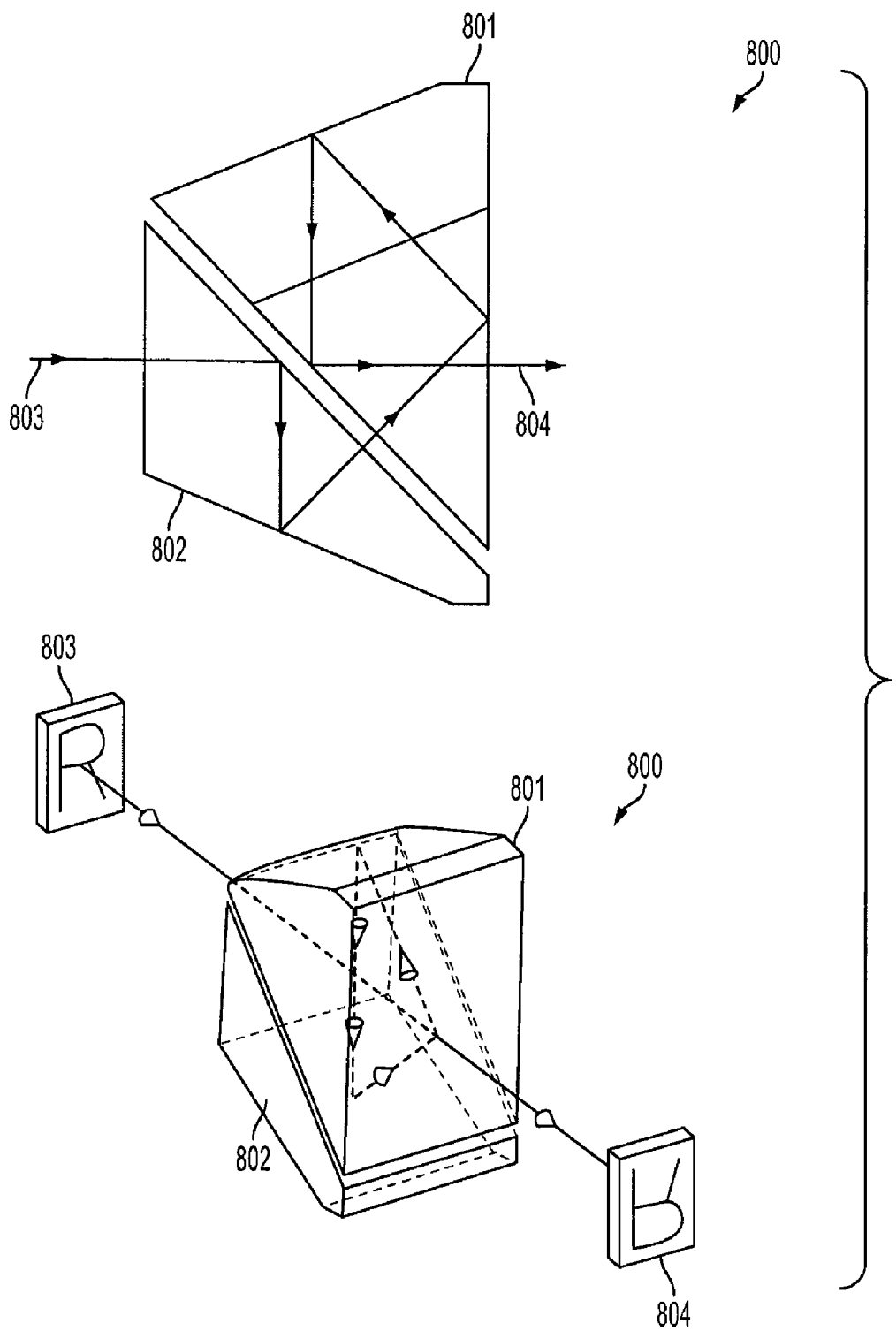
FIG. 8 is an exemplary configuration showing a Pechan prism of the camera or periscope system according to an embodiment of the invention.
Figure 9:
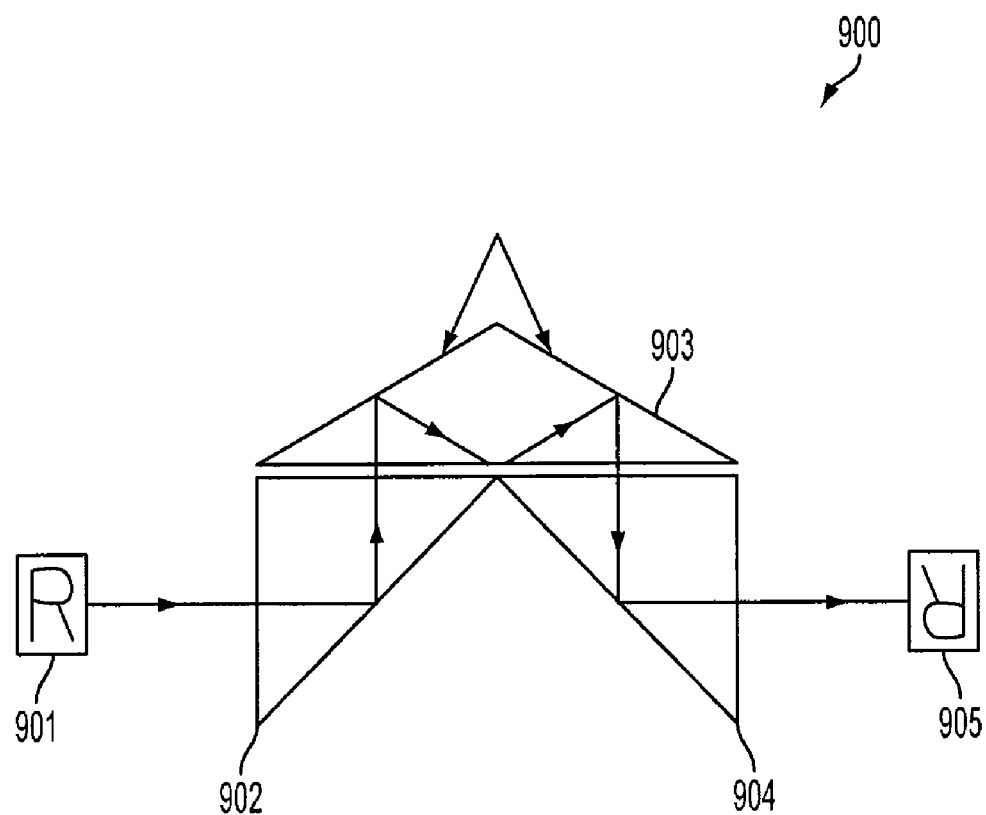
FIG. 9 is an exemplary configuration showing a Compact prism of the camera or periscope system according to an embodiment of the invention.

The image rotation device 120 rotates the image being produced or recorded. The rotation can be used to erect, roll or invert the image being produced or recorded. The image rotation device 120 may include one or more Pechan prisms and/or one or more Compact prisms. In one embodiment, the image rotation device 120 is a Pechan prism. For example, FIG. 8 shows an exemplary configuration of the Pechan prism 800, which may include the prisms 801 and 802 separated by an air gap. As shown in FIG. 8, an object 803 may be rotated by the Pechan prism 800 to form a rotated image 804. In another embodiment, the image rotation device 120 is a Compact prism. For example, FIG. 9 shows an exemplary configuration of the Compact prism 900, which may include the prisms 902, 903, and 904. As shown in FIG. 9, an object 901 may be rotated by the Compact prism 900 to form a rotated image 905.

The image is projected onto an image plane 130, which can be film or an electronic sensor for a digital camera or a video High Definition (HD) camera or video recorder. The electronic sensor (e.g., electronic CCD) can capture the image and store the image in memory (not shown). The memory may be hardware and/or software such as RAM memory, flash memory, ROM memory, EPROM memory, EEPROM memory, registers, hard disk, removable disk, CD-ROM, or any other form of storage medium known in the art.

Figure 2:
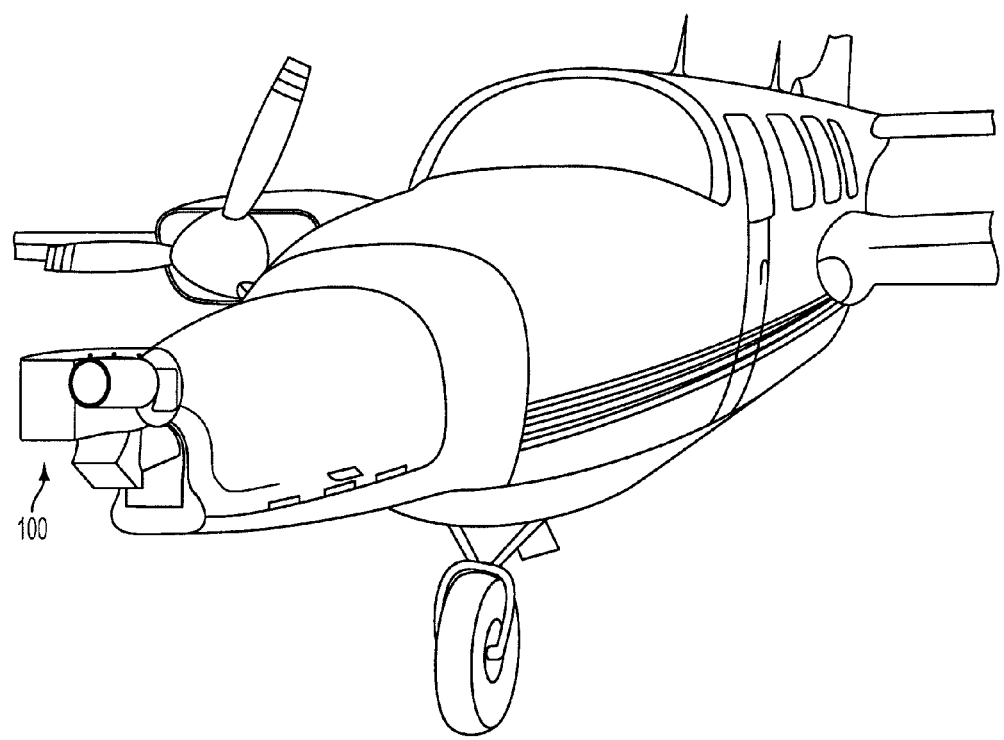
FIG. 2 is an exemplary configuration showing the camera or periscope system of FIG. 1 attached to a nose of an airplane according to an embodiment of the invention.
Figure 3:
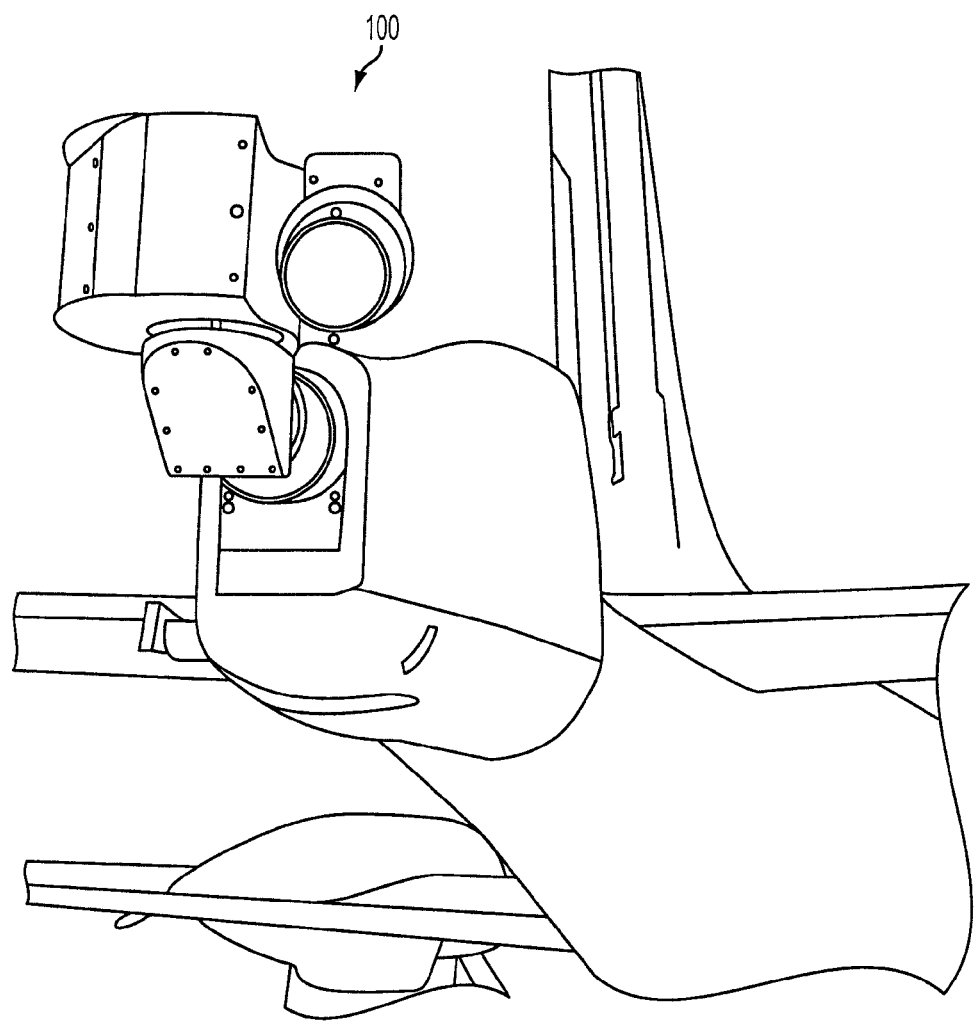
FIG. 3 is an exemplary configuration showing the camera or periscope system of FIG. 1 attached to a tail of an airplane according to an embodiment of the invention.

FIG. 2 is an exemplary configuration showing the camera or periscope system 100 of FIG. 1 attached to a nose of an airplane according to an embodiment of the invention. FIG. 3 is an exemplary configuration showing the camera or periscope system 100 of FIG. 1 attached to a tail of an airplane according to an embodiment of the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiment can be configured without departing from the scope and spirit of the invention. Therefore, it is to be understood that, within the scope of the appended claims, the invention may be practiced other than as specifically described herein.

What is claimed is:

1. A fully articulated periscope system comprising:
   a lens configured to produce an image;
   a beam steering device configured to receive a ray of light from the lens and configured to redirect the ray of light at least three times and each time at a substantially right angle, wherein the beam steering device rotates with the lens;
   a relay lens configured to receive the ray of light from the beam steering device; and
   an image rotation device configured to receive the ray of light from the relay lens and to rotate the image.

2. The periscope system of claim 1, wherein the lens is a zoom lens.

3. The periscope system of claim 1, wherein the lens comprises a multi-element lens assembly.

4. The periscope system of claim 1, wherein the lens is a rotatable lens that can rotate 360 degrees.

5. The periscope system of claim 1, wherein the beam steering device comprises one or more mirrors.

6. The periscope system of claim 1, wherein the beam steering device comprises one or more prisms.

7. The periscope system of claim 1, wherein the beam steering device is selected from a group consisting of 2 prisms, 3 prisms, and 4 prisms.

8. The periscope system of claim 1, wherein the beam steering device comprises a field lens to direct the ray of light to the relay lens.

9. The periscope system of claim 1, wherein the beam steering device comprises coherent fiber optic bundles.

10. The periscope system of claim 1, wherein the beam steering device comprises 3 right angle prisms and a field lens.

11. The periscope system of claim 1, wherein the relay lens comprises a multi-element lens assembly.

12. The periscope system of claim 1, wherein the relay lens is positioned within a folded housing.

13. The periscope system of claim 1, wherein the relay lens changes the intermediate image size to match a desired image format.

14. The periscope system of claim 1, wherein the relay lens comprises a plurality of different relay lenses having different magnifications.

15. The periscope system of claim 1, wherein the image rotation device comprises a Pechan prism.

16. The periscope system of claim 1, wherein the image rotation device comprises a Compact prism.

17. The periscope system of claim 1, wherein the beam steering device comprises 3 right angle prisms and a field lens, the relay lens is a straight multi-element lens assembly, and the image rotation device is a Pechan prism.

18. The periscope system of claim 1, wherein the relay lens comprises a zoom lens.

19. A fully articulated periscope system comprising:
a housing;
a taking lens configured to receive light that produces an image;
a first right angle prism positioned adjacent to the taking lens, configured to receive the light from the taking lens, and configured to redirect the light at a first substantially right angle;
a field lens positioned adjacent to the first right angle prism and configured to receive the light from the first right angle prism;
a second right angle prism positioned adjacent to the field lens, configured to receive the light from the field lens, and configured to redirect the light at a second substantially right angle;
a third right angle prism positioned adjacent to the second right angle prism, configured to receive the light from the second right angle prism, and configured to redirect the light at a third substantially right angle;
a relay lens positioned within the housing and configured to receive the light from the third right angle prism; and
a Pechan prism configured to receive the light from the relay lens and rotate the image.

20. A fully articulated periscope system comprising:
a lens configured to produce an image, the lens is a rotatable lens that can rotate 360 degrees;
a beam steering device configured to receive a ray of light from the lens and configured to redirect the ray of light at least three times and each time at a substantially right angle;
a relay lens configured to receive the ray of light from the beam steering device; and
an image rotation device configured to receive the ray of light from the relay lens and to rotate the image.

21. The periscope system of claim 20, wherein the lens is a zoom lens.

22. The periscope system of claim 20, wherein the lens comprises a multi-element lens assembly.

23. The periscope system of claim 20, wherein the beam steering device comprises one or more mirrors.

24. The periscope system of claim 20, wherein the beam steering device comprises one or more prisms.

25. The periscope system of claim 20, wherein the beam steering device is selected from a group consisting of 2 prisms, 3 prisms, and 4 prisms.

26. The periscope system of claim 20, wherein the beam steering device comprises a field lens to direct the ray of light to the relay lens.

27. The periscope system of claim 20, wherein the beam steering device comprises coherent fiber optic bundles.

28. The periscope system of claim 20, wherein the beam steering device comprises 3 right angle prisms and a field lens.

29. The periscope system of claim 20, wherein the beam steering device rotates with the lens.

30. The periscope system of claim 20, wherein the relay lens comprises a multi-element lens assembly.

31. The periscope system of claim 20, wherein the relay lens is positioned within a folded housing.

32. The periscope system of claim 20, wherein the relay lens changes the intermediate image size to match a desired image format.

33. The periscope system of claim 20, wherein the relay lens comprises a plurality of different relay lenses having different magnifications.

34. The periscope system of claim 20, wherein the image rotation device comprises a Pechan prism.

35. The periscope system of claim 20, wherein the image rotation device comprises a Compact prism.

36. The periscope system of claim 20, wherein the beam steering device comprises 3 right angle prisms and a field lens, the relay lens is a straight multi-element lens assembly, and the image rotation device is a Pechan prism.

37. The periscope system of claim 20, wherein the relay lens comprises a zoom lens.

* * * * *